Figure 1:
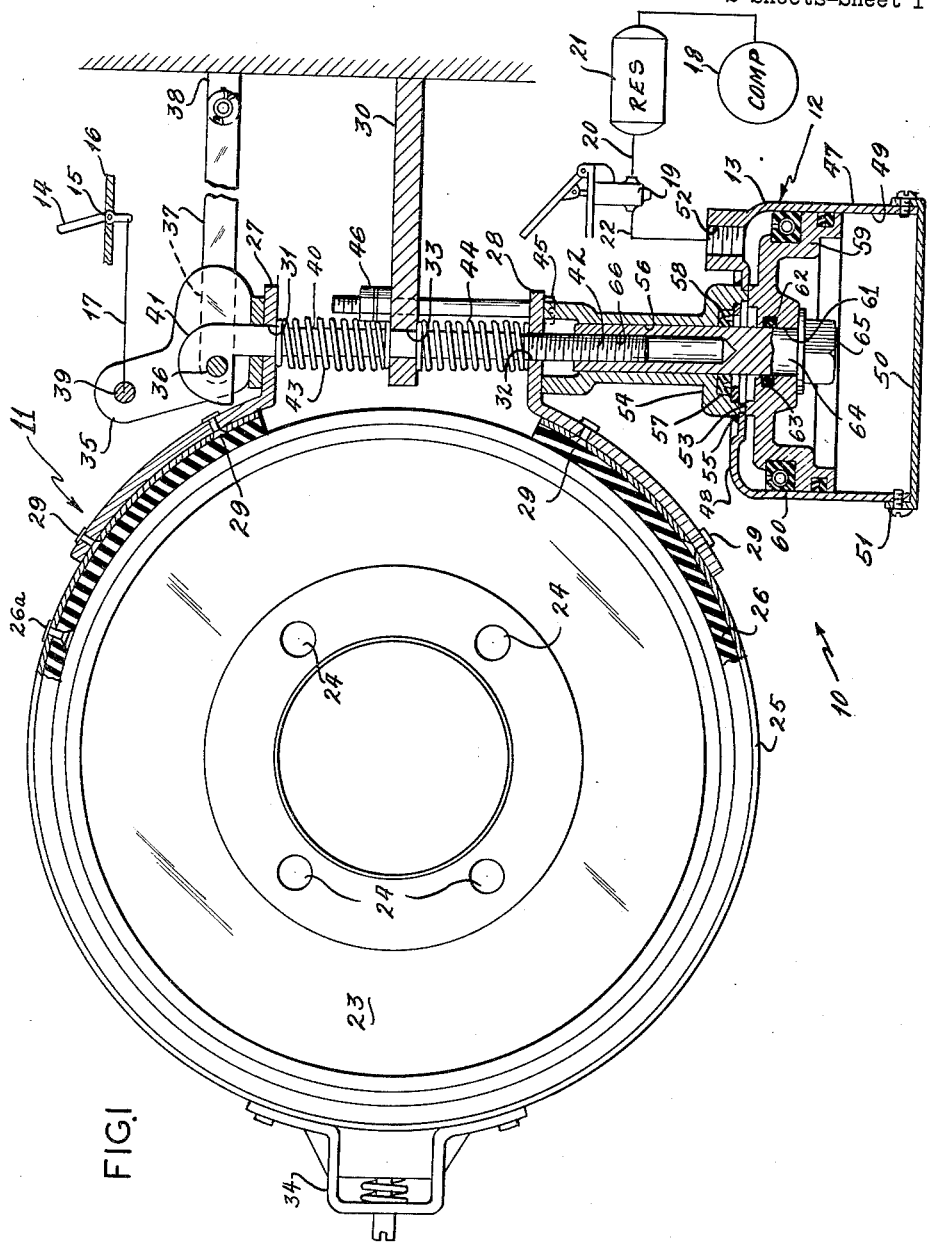

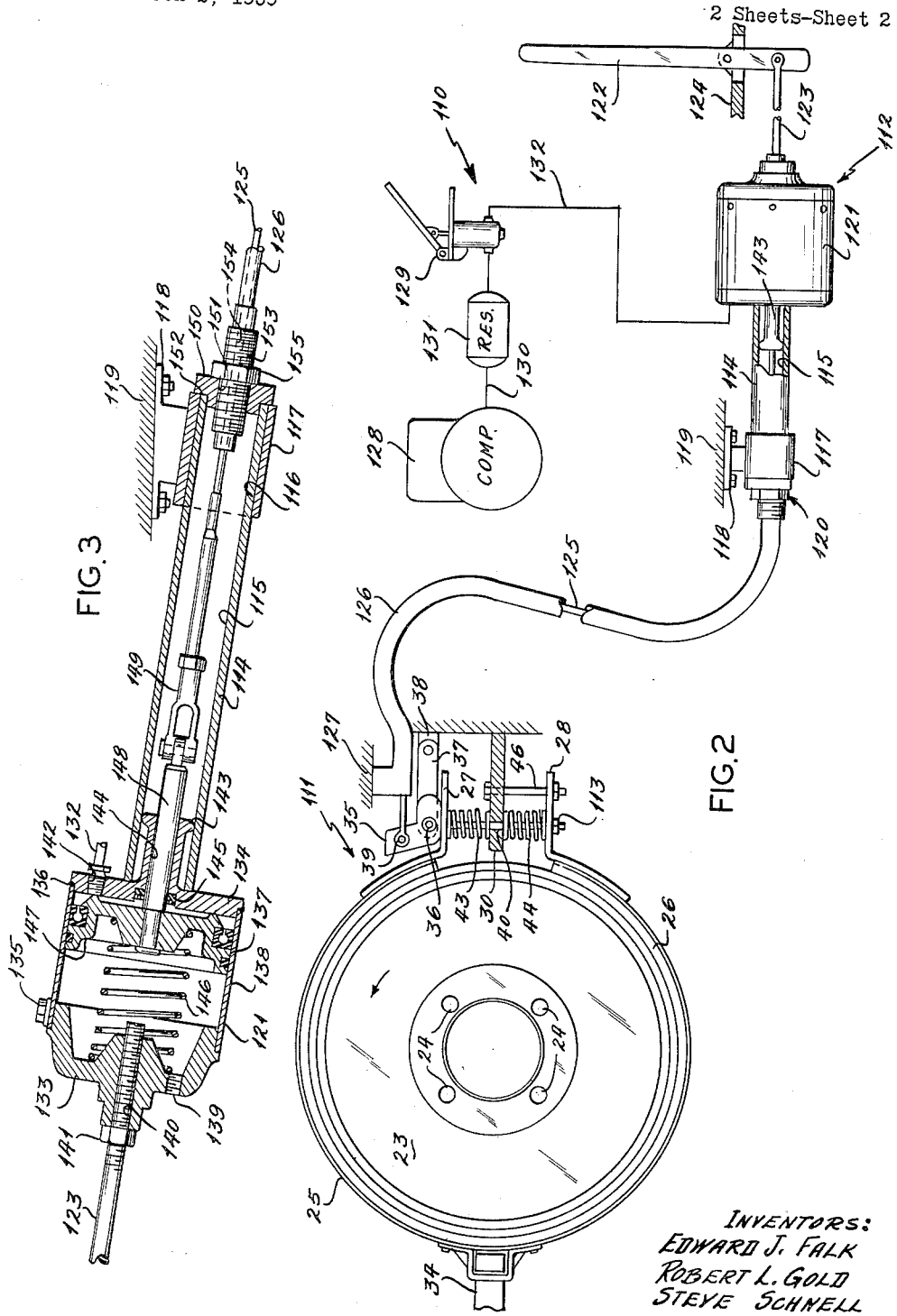

United States Patent Office 3,036,668
Patented May 29, 1962

3,036,668
OPERATING MECHANISM FOR FRICTION DEVICES
Edward J. Falk, St. Louis, Robert L. Gold, Pine Lawn, and Steve Schnell, St. Louis, Mo., assignors to Wagner Electric Corporation, St. Louis, Mo., a corporation of Delaware
Filed Mar. 2, 1959, Ser. No. 796,501
3 Claims. (Cl. 188—77)

This invention relates to operating mechanisms for friction devices and in particular to those actuated by fluid pressure and/or independent manual means.

One of the principal objects of the present invention is to provide an operating mechanism for friction devices which can be selectively actuated by pressure responsive means and/or independent manual means without interference therebetween.

Another object of the present invention is to provide an operating mechanism for friction devices in which the actuating force applied by fluid pressure responsive means and the actuating force applied by independent manual means are not additive.

Still another object of the present invention is to provide an operating mechanism for friction devices which have simplified slack adjustment means.

Briefly, the present invention is embodied in an operating mechanism having a cylinder with a piston therein which are relatively movable in response to an applied fluid pressure to energize a friction device and movable in concert in response to independent manual actuating means to energize said friction device.

The invention also consists in the parts and in the arrangement and combination of parts hereinafter described and claimed. In the accompanying drawings which form a part of this specification and wherein like numerals refer to like parts wherever they occur:

FIG. 1 is a diagrammatic view of a brake system showing our operating mechanism for a friction device in cross-section, FIG. 2 is a diagrammatic view of a modified brake system showing a remotely positioned operating mechanism for a friction device, and FIG. 3 is an enlarged sectional view showing the remotely positioned operating mechanism in cross-section and facing in a direction opposite to that shown in FIG. 2.

Referring now to FIG. 1 in detail, a brake system 10 is provided with a brake or friction device 11 and operating mechanism 12 therefor which includes pressure responsive actuating means, such as a power cylinder 13, and independent manual actuating means, such as a manually operated lever or hand brake lever 14. The hand brake lever 14 is pivotally mounted at 15 on a stationary support 16 and is operatively connected with the friction device 11 by a connecting rod or cable 17. To complete the brake system 10, pressure generating means, such as a compressor 18, which is driven by a vehicle engine (not shown), or other means as desired, is connected to the inlet side of an application valve 19 by a conduit 20 which has a reservoir 21 interposed therein, and the outlet side of said application valve is connected to the actuating port of the power cylinder 13 by a conduit 22. While only one friction device has been described in the system 10, it is to be understood that others could be similarly employed therein.

The friction device 11 is provided with a drum 23 having a plurality of mounting holes 24 for attachment with a rotatable member, such as a vehicle axle or drive shaft (not shown), and a metallic band 25, having a friction element or material 26 secured thereto by suitable means, such as a plurality of rivets 26a, extends substantially about the periphery of said drum for frictional engagement therewith. It is to be understood that a jacketed, metallic type friction element through which cooling fluid is continuously circulated could be employed with the brake band 25; however, the friction material 26 is preferred for simplicity of disclosure. Opposed upper and lower flanges 27 and 28 are fixedly attached to the adjacent ends of the band 25 by suitable means, such as a plurality of rivets 29, and said flanges are normally juxtaposed with a stationary support member 30, said flanges and support member having aligned, bolt receiving apertures 31, 32 and 33, respectively, therein. The midportion of the band 25 is connected with another support member 34 to prevent rotation of said band with the drum 23 during frictional engagement.

Spaced, brake actuating cam members 35 are pivotally received on a pin 36 which is carried by one end of spaced linkage 37 while the other end thereof is pivotally connected with a stationary support member 38. Another pin 39 is carried by cam members 35 to receive the cable 17 which connects with the hand brake lever 14, as previously mentioned. A J-type bolt 40 is provided with a curved or hooked upper end portion 41 which is also received on the pivot pin 36, being interposed between and in abutment with cam members 35, and a lower end portion 42 of said J-bolt extends through the apertures 31, 32, and 33 in flanges 27 and 28 and support member 30, respectively, into operative connection with the power cylinder 13 (to be discussed later). Return springs 43 and 44 are carried on the J-bolt 40 and are interposed between the upper flange 27 and support member 30 and the lower flange 28 and said support member, respectively. The return spring 43 normally biases the upper flange 27 into abutment with cam members 35, and the return spring 43 normally biases the lower flange 28 into abutment with a retaining head 45 of a bolt and nut assembly 46 which is interposed between said lower flange and stationary support member for brake adjustment purposes.

The power cylinder 13 is provided with a cup shaped housing 47 having an integral end wall 48 and a bore 49, and the open end of said bore is closed by a dust shield 50 fixedly attached to said housing by suitable means, such as a plurality of metal screws 51. The end wall 48 is provided with an actuating port 52 which receives the conduit 22, as previously mentioned, and a centrally located aperture 53 in which an extension 54 is fixedly positioned by suitable means, such as a weld 55. The extension is provided with a vertical bore 56, and a seal assembly 57 is provided in a recess 58 in the lower end of said vertical bore. A piston 59 is slidably received in the housing bore 49 and carries a seal 60 for sealable engagement with the wall of said housing bore. The piston 59 is also provided with a bore 61 which is axially aligned with the extension bore 56, and a suitable groove 62 is provided in said bore to receive an O-ring 63. An adjusting rod member 64 is slidably received in the piston bore 61 and extension bore 56 and is sealably engaged by the sealing cup assembly 57 and the O-ring 63. The adjusting rod member 64 is provided with a hexagonally shaped head 65 on the one end which is normally in abutment with the piston 59, and a threaded bore 66 is axially provided through the other end thereof to cooperatively receive the lower end portion 42 of the J-bolt 40, as previously mentioned. The adjusting rod member 64 is threadedly engaged with the J-bolt 40 so that piston 59 is normally positioned in abutment with the end wall 48 of the housing 47 and the upper end of the extension 54 is abuttingly engaged with the lower flange 28. In this manner, the adjusting rod member 64 not only serves as a piston rod for the piston 59 but also as slack adjustment means when threadedly engaged with the J-bolt 40 to adjust the relative positions of flanges 27 and 28 upon wear of the friction element due to frictional engagement.

In the operation with the component parts of the system 10 in their normal positions, as previously described herein, it is assumed that the adjustment assembly 46 for the friction device 11 is initially set to effect proper adjustment of said friction device.

If the operator desires to decelerate the vehicle and/or effect a complete stop by utilizing only the pressure responsive actuating means for the friction device 11, a manual force is applied to actuate the application valve 19 which allows pressure fluid flow from the reservoir 21 into the bore 49 of the power cylinder 13 via conduits 20 and 22 and the power cylinder actuating port 52. The pressure fluid in the power cylinder bore 49 establishes a fluid pressure which acts on the effective area of the piston 59 and seal 60 to create a downward force, and this force moves said piston and seal downwardly in said bore relative to the power cylinder housing 47. This downward movement of the piston 59 and seal 60 is also imparted to the rod 64, the J-bolt 40, and cam members 35 which in turn effects downward movement of the upper flange 27 against the compressive force of the spring 43 to frictionally engage the friction material 26 on the band 25 with the drum 23. Simultaneously therewith, the fluid pressure in the power cylinder bore 49 also acts on the effective area of the end wall 48 of the power cylinder housing 47 to create an upward force which is substantially equal to the aforementioned downward force, and this upward force moves the power cylinder housing 47 and the extension 54 upwardly relative to the piston 59. This upward movement of the power cylinder housing 47 and extension 54 is imparted to the flange 28 against the compressive force of the spring 44 in order to frictionally engage the friction material 26 on the band 25 with the drum 23. Therefore, actuation of the pressure responsive actuating means, or power cylinder 13, simultaneously effects relative movement between the housing 47 and extension 54 and the piston 59 thereof to move the flanges 27 and 28 in a friction device energizing direction, that is toward each other, in order to establish frictional engagement between the friction material carrying band 25 and the drum 23.

When the desired rate of deceleration is attained or a stop completed, the applying force is removed from the application valve 19, and the pressure fluid in the power cylinder bore 49 is vented to atmosphere via the actuating port 52, the conduit 22, and said application valve. Upon venting the pressure fluid to atmosphere, the return springs 43 and 44 return the component parts of the system 10 to their original positions.

If the operator desires to decelerate the vehicle and/or effect a complete stop by utilizing only the independent manual actuating means for the friction device 11, a force is applied to the hand brake lever 14 so that the cable 17 rotates cam members 35 about the pivot pin 36. In this manner, the flange 27 is cammed downward against the compressive force of the spring 43 to effect frictional engagement between the friction material carrying band 25 and the drum 23. Simultaneously therewith, the rotation of cam members 35 moves the pivot pin 36 upwardly which, in turn, imparts upward movement to the J-bolt 40, and the rod 64, the piston 59, the power cylinder housing 47, and the extension 54 are carried upwardly therewith in concert to move the flange 28 upwardly in order to frictionally engage the friction material 26 on the band 25 with the drum 23. Therefore, actuation of the independent manual actuating means, or hand brake lever 14, rotates cam members 35 which simultaneously effects downward movement to the flange 27 and concert upward movement of the J-bolt 40 and the component parts of the power cylinder 13 to move the flange 28 upwardly in order to establish frictional engagement between the friction material carrying band 25 and the drum 23.

When the desired rate of deceleration is attained or a stop completed, the applying force is removed from the hand brake lever 14 and the compressive force of the return springs 43 and 44 return the component parts of the system 10 to their original positions.

If the operator desires to initially effect deceleration and/or a complete stop by utilizing the independent manual actuating means, a manual force is applied to actuate the hand brake lever 14 and effect energization of the friction device 11, as previously discussed. If the operator subsequently desires to also utilize the pressure responsive actuating means, a manual force is applied to actuate the application valve 19 to meter pressure fluid to the power cylinder 13, as previously described; however, the upward and downward forces created by the actuation of said power cylinder will not effect energization of the friction device 11 until the magnitudes thereof become greater than the magnitudes of the upward and downward forces created by actuating the hand brake lever 14. In other words, the forces created by the pressure repsnosive actuating means and the independent manual device 11 cannot be over energized or applied, and the operator will not be afforded a false feel during the energization of said friction device due to malfunctioning or misoperation of one or the other of the actuating means 13 and 14. Of course, upon completion of the desired rate of deceleration or a complete stop, the applied manual forces are removed from the hand brake lever 14 and the application valve 19 which allows the component parts of the system 10 to return to their original positions, as previously described.

In the event that the friction material 26 wears due to frictional engagement with the drum 23, the slack developed thereby in the friction device 11 is compensated for by the slack adjusting rod member 64. To remove the above mentioned slack, the operator removes the dust shield 50 from the power cylinder 13 and merely rotates the adjusting rod member 64 further into threaded engagement with the lower end 42 of the J-bolt 40. In this manner, the component parts of the power cylinder 13 are moved upwardly in concert which, in turn, moves the flange 28 upwardly, and simultaneously the upper or curved end 41 of said J-bolt carries cam members 35 and the pivot pin 36 downwardly which, in turn, moves the flange 27 downwardly. In this manner, the flanges 27 and 28 are moved toward each other until the desired relative position between the friction material 26 and the drum 23 is attained thereby removing the slack from the system 10.

From the foregoing, it is apparent that operating mechanism for friction devices is provided which can be selectively actuated by pressure responsive actuating means 13 and/or independent manual actuating means 14 without interference therebetween. When the hand brake lever 14 is actuated to rotate cam members 35 in order to energize the friction device 11, the component parts of the power cylinder 13 are moved in a friction device energizing direction; however, there is no relative movement between the component parts of said power cylinder, that is the component parts are moved in concert. When the power cylinder 13 is actuated in order to energize the friction device, cam members 35 and parts associated therewith are moved in a friction device energizing direction; however, said cam members are not rotated and the hand brake lever 14 is unaffected by this movement of said cam members. Thus, the friction device 11 may be energized by the power cylinder 13, as when retarding, without interference with the hand brake lever 14, and said hand brake lever may be set manually, as when parking, without interference with said power cylinder.

It is apparent that operating mechanism for friction devices is provided in which the actuating force applied by the pressure responsive actuating means 13 and the actuating force applied by the independent manual actuating means 14 are not additive. When the hand brake lever 14 is actuated, forces are created on the flanges 27 and 28 which move said flanges in a direction to effect energization of the friction device 11. Subsequent actuation of the power cylinder 13 also creates forces on the flanges 27 and 28 which are directed to energize the friction device 11; however, the forces established by the power cylinder 13 will not effect energization of said friction device until the magnitudes thereof become greater than the forces established by the hand brake lever 14. When the magnitude of the forces established by the power cylinder 13 become greater than those established by the hand brake lever 14, said power cylinder then assumes the burden of energizing the friction device 11. In the same manner, of course, the forces established by the hand brake lever 14 can be of such magnitude to become greater than those established by the power cylinder 13 so that said hand brake lever assumes the burden of energizing the friction device 11. Therefore, in view of the above, the actuating forces of the pressure responsive actuating means 13 and the independent manual actuating means 14 are not additive, and although the maximum torque of the friction device 11 may be limited, as determined by shaft strength and heat liberation capabilities, for instance, the full maximum torque is available to either said pressure responsive actuating means or said independent manual actuating means.

It is also apparent that operating mechanism for friction devices is provided having simplified slack adjusting means. When slack is developed in the system 10 due to wear of the friction material 26 from energization of the friction device 11, the adjusting rod member 64, which also serves as a piston rod for the piston 59, is rotated further into threaded engagement with the lower end portion 42 of the J-bolt 40. As a result, the component parts of the power cylinder 13 and the flange 28 are moved upwardly in concert, and the upper end portion 41 of said J-bolt moves the cam members 35, the pivot pin 36, and the flange 27 downwardly in concert. In this manner, the flanges 27 and 28 are moved toward each other until the desired relative position between the friction material 26 and drum 23 is attained thereby removing the slack from the system 10.

Referring now to FIGS. 2 and 3 in detail, a modified brake system, indicated generally at 110, is provided with a friction device 111 and remotely positioned operating mechanism 112 therefor, and the component parts of the friction device 111 are essentially the same as the friction device 11 of FIG. 1 except that a lock nut 113 is threadedly received on the lower end of the J-bolt 40 in abutment with the lower flange 28.

The operating mechanism 112 for the friction device 111 is provided with a guide sleeve or support member 114 having a bore 115 therethrough. The guide sleeve 114 is slidably and rotatably received in a bore 116 of a mounting bracket housing 117 which is fixedly attached by suitable means, such as studs 118, to a stationary member, such as a vehicle frame indicated at 119. The guide sleeve 114 is provided with a slack adjustment mechanism 120 (to be discussed later) on one end thereof while pressure responsive actuating means, or power cylinder 121, is slidably received in the other end thereof. The power cylinder 121 is operatively connected with independent manual operating means, such as a manually operated hand brake lever 122 by a connecting rod 123, and said hand brake lever is pivotally attached to a stationary support at 124. The power cylinder 121 is also operably connected with the friction device 111 by a control wire 125 which extends through the guide sleeve bore 115 and slack adjustment mechanism 120 to connect with cam members 35 of the friction device 111. A protective sheath 126 for the control wire 125 has one end fixedly attached with the adjustment mechanism 120, while the other end thereof is shown fixedly attached to a stationary member 127 which is preferred, for purposes of disclosure, to be positioned near the friction device 111. To complete the system 110, pressure generating means, such as a compressor 128, is connected to the inlet side of an application valve 129 by a conduit 130 which has a reservoir 131 interposed therein, and the outlet side of said application valve is connected to the actuating port of the power cylinder 121 by a conduit 132.

The power cylinder 121 is provided with opposed end plates 133 and 134 which are fixedly attached by suitable means, such as cap screws 135 and a weld 136, respectively, to a housing member 137 which has a bore 138 therein. The end plate 133 is provided with a passage 139 serving as a vent for the housing bore 138 and also is provided with a centrally located, threaded bore 140. The threaded bore 140 cooperatively receives one end of the rod 123 and the other end thereof connects with the hand brake lever 122, as previously mentioned; and, said rod is fixedly positioned relative to the end plate 133 by a lock nut 141 threadedly received on said rod. The end plate 134 is provided with an actuating port 142 which receives the conduit 132, as previously mentioned, and is also provided with an integral extension 143 which is slidably received in the bore 115 of the guide sleeve 114. The end plate 134 and extension 143 are provided with a bore 144 therethrough, and a seal assembly 145 is positioned adjacent the inner end of said bore. A spring 146 is interposed between the end plate 133 and a seal carrying piston 147 which is slidably received in the housing bore 138 to normally bias said piston into abutting engagement with the end plate 134. The piston 147 is provided with an integral piston rod 148 which is slidably received in the bore 144 of the extension 143 and extends coaxially through the bore 115 of the guide sleeve 114 into pivotal connection with a clevis 149 provided on one end of control wire 125 while the other end thereof connects with the cam members 35 of the friction device 111, as previously mentioned.

The slack adjustment mechanism 120 includes a hexagonally shaped, closure member 150 having a threaded bore 151 therethrough, which is fixedly attached to the rightward end of the guide sleeve 114 by suitable means, such as the weld 152, and said closure member is adapted to be normally in abutment with the rightward end of the mounting bracket 117. A threaded sleeve 153 is provided with a bore 154 to slidably receive the control wire 125 and is cooperatively received in the threaded bore 151 of the closure member 150. One end of the protective sheath 126 for the control wire 125 is fixedly received by the threaded sleeve 153 while the other end thereof is fixedly connected to a stationary support 127, as previously mentioned; therefore, said threaded sleeve and protective sheath are movable relative to the closure member 150 and control wire 125 for slack adjustment purposes. A lock nut 155 carried on the threaded sleeve 153 is movable into locking abutment with the closure member 150 to fixedly position said threaded sleeve relative to said closure member.

In the operation, the component parts of the system 110 are in their normal positions, as previously described herein (see FIG. 2).

If the operator desires to decelerate the vehicle and/or effect a complete stop by utilizing only the pressure responsive actuating means for the friction device 111, a manual force is applied to actuate the application valve 129 and allow pressure fluid flow from the reservoir 131 into the power cylinder bore 138 via conduits 130 and 142 and the actuating port 142. The pressure fluid in the power cylinder bore 138 establishes a fluid pressure which acts on the opposing effective areas of the piston 147 and the end plate 134 creating opposing forces to effect relative movement between the piston 147 and the power cylinder housing 137. The force on the piston 147 moves said piston and the rod 148 leftwardly in their respective bores 138 and 144. This leftward movement of the piston 147 and rod 148 is also imparted to the control wire 125 which slides through the protective sheath 126 therefor to effect rotation of cam members 35 on the friction device 111. The guide sleeve 114 and the control wire 125 and sheath 126, which become substantially rigid when actuated, oppose the force on the end plate 134 and thereby obviates rightward movement of the power cylinder 137. Rotation of cam members 35 moves the flange 27 of the friction device 111 downwardly against the compressive force of the spring 43 and simultaneously moves the pivot pin 36 upwardly so that the J-bolt 40 and flange 28 are carried upwardly therewith against the compressive force of the spring 44. In this manner, the flanges 27 and 28 are moved in a friction device energizing direction so that the friction material 26 on the band 25 is frictionally engaged with the drum 23.

When the desired rate of deceleration is attained or a stop completed, the applying force is removed from the application valve 129, and the pressure fluid in the power cylinder bore 138 is vented to atmosphere via the actuation port 142, the conduit 132, and said application valve. Upon venting the pressure fluid to atmosphere, the return spring 146 in the power cylinder 121 and the return springs 43 and 44 of the friction device 111 returns the component parts of the system 110 to their original positions.

If the operator desires to decelerate the vehicle and/or effect a complete stop by utilizing only the independent manual actuating means, a force is applied to the hand brake lever 122 so that the rod 123 moves the power cylinder housing 137 and piston 147 leftwardly in concert. This leftward movement is also imparted to the control wire 125 which effects rotation of cam members 35 to energize the friction device, as previously described.

When the desired rate of deceleration is attained or a stop completed, the applying force is removed from the hand brake lever 122, and the return springs 43 and 44 of the friction device 111 return the component parts of the system 110 to their original positions.

If the manual force is applied to the hand brake lever 122 to effect energization of the friction device 111 for purposes of retarding or parking, as previously described, and the operator subsequently desires to also utilize the power cylinder 121, a manual force is applied to the application valve 129 to meter pressure fluid to said power cylinder, as previously described; however, the force created by the actuation of said power cylinder will not effect energization of said friction devices until the magnitude thereof becomes greater than the magnitude of the force created by actuating said hand brake lever. In other words, the forces created by the pressure responsive actuating means 121 and the independent manual actuating means 122 are not additive; therefore, the friction device 111 cannot be over energized or applied, and the operator will not be afforded a false feel during the energization of said friction device due to malfunctioning or misoperation of one or the other of said actuating means. Of course, upon completion of the desired rate of deceleration or a complete stop, the applied forces are removed from the application valve 129 and hand brake lever 122 which allows the component parts of the system 110 to return to their original positions, as previously described.

This invention is intended to cover all changes and modifications of the examples of the invention herein chosen for purposes of the disclosure, which do not constitute departures from the spirit and scope of the invention.

What is claimed is:

1. An operating mechanism for a friction device including a brake drum, a brake band embracing said drum for frictional engagement therewith, said brake band having flanges on the opposed ends thereof at one side of said drum, said flanges being movable toward each other to frictionally engage said brake band and drum, a bolt extending through said flanges, spring means on said bolt normally maintaining said flanges in spaced relation, cam means pivotally mounted on one end of said bolt and in abutment with one of said flanges, manual actuating means operatively connected with said cam means, and pressure responsive actuating means including a housing, a piston slidable in said housing, adjusting means between said piston and the other end of said bolt to normally position said housing in abutment with the other of said flanges, said piston and housing being relatively movable in response to an applied fluid pressure to move said flanges toward each other in order to frictionally engage said band and drum independently of said manual actuating means, and said piston and housing being movable in concert with said cam means in response to said manual actuating means to move said flanges toward each other in order to frictionally engage said band and drum.

2. An operating mechanism for a friction device comprising a drum, band means engageable with said drum and having flanges adjacent the opposed ends thereof, said flanges being movable toward each other to effect energization of said friction device, bolt means extending through said flanges, spring means on said bolt means normally maintaining said flanges in spaced relation, cam means pivotally received on one end of said bolt means and normally in abutment with one of said flanges, manual actuating means for energizing said friction device operatively connected with said cam means, pressure responsive actuating means for energizing said friction device including a power cylinder having a housing adapted for abutment with the other of said flanges, and a piston slidable in said housing, adjustment means connected between said piston and the other end of said bolt means to normally position said piston in abutment with one end wall of said housing and urge said housing into abutment with the other of said flanges, said piston and housing being relatively movable in response to an applied fluid pressure to move said flanges in a friction device energizing direction, said manual actuating means being movable to actuate said cam means and move said one of said flanges in a friction device energizing direction, said piston being movable in concert with said cam means in response to the manual actuating means to move said housing and the other of said flanges in a friction device energizing direction.

3. An operating mechanism for a friction device including a drum, band means embracing said drum and adapted for frictional engagement therewith, said band means having flanges on the opposed end portions thereof at one side of said drum, said flanges being movable toward each other to frictionally engage said band means and drum and energize said friction device, a bolt extending through said flanges, at least one spring carried on said bolt and normally maintaining said flanges in spaced relation, a bell crank type cam pivotally received on one end of said bolt and normally in abutting engagement with one of said flanges, manual actuating means for energizing said friction device including a manually operated lever remotely positioned with respect to said cam, and cable means operatively connecting said manually operated lever with said cam means, pressure responsive actuating means for energizing said friction device independently of said manual actuating means including a power cylinder, said power cylinder having a housing with an integral extension normally in abutment with the other of said flanges, a piston slidable in said housing, an adjustment rod member slidable in said extension having one end threadedly engaged with the other end of said bolt and the other end thereof normally urging said piston into abutment with the end wall of said housing, said piston and housing being relatively movable in response to an applied fluid pressure to move said flanges in a friction device energizing direction without affecting the instantaneous position of said manually operated lever, said manually operated lever being movable to pivot said cam and move said one of said flanges in a friction device energizing direction without affecting the instantaneous relative position of said housing and piston, said housing and piston being movable in concert in response to the actuation of said cam to move the other of said flanges in a friction device energizing direction.

References Cited in the file of this patent

UNITED STATES PATENTS

| | | |
|---|---|---|
| 1,825,296 | Zink | Sept. 29, 1931 |
| 1,958,236 | Dickey | May 8, 1934 |
| 2,116,882 | Dickey | May 10, 1938 |
| 2,155,030 | Wilkins | Apr. 18, 1939 |
| 2,174,018 | Schaum | Sept. 26, 1939 |
| 2,237,095 | Casner | Apr. 1, 1941 |
| 2,395,207 | Williams | Feb. 19, 1946 |
| 2,867,295 | Butler | Jan. 6, 1959 |

FOREIGN PATENTS

| | | |
|---|---|---|
| 590,534 | Great Britain | July 21, 1947 |